United States Patent [19]
Chen et al.

[11] Patent Number: 5,977,281
[45] Date of Patent: Nov. 2, 1999

[54] SHEET AND TUBE SILOXANE POLYMERS CONTAINING MULTIPLE PENDENT GROUPS

[75] Inventors: Chenggang Chen, Cleveland, Ohio; Dimitris Elias Katsoulis, Midland, Mich.; Malcolm Edward Kenney, Cleveland Heights, Ohio

[73] Assignees: Case Western Reserve University, Cleveland, Ohio; Dow Corning Corporation, Midland, Mich.

[21] Appl. No.: 09/089,700

[22] Filed: Jun. 3, 1998

[51] Int. Cl.$^6$ .................................................. C08G 77/06
[52] U.S. Cl. ............................... 528/24; 528/10; 528/32; 524/770; 524/790; 525/474
[58] Field of Search ............................. 528/10, 32, 24; 524/770, 790; 525/474

[56] References Cited

U.S. PATENT DOCUMENTS 5,605,982  2/1997  Chao ........................................ 525/474
5,627,241  5/1997  Chen ........................................ 525/474

*Primary Examiner*—Melvyn I. Marquis
*Assistant Examiner*—Mark W. Milstead
*Attorney, Agent, or Firm*—James L. De Cesare

[57] ABSTRACT

A method for synthesizing an apophyllite-derived 3-cyanopropyldimethylsiloxy-5-hexenyldimethylsiloxy sheet polymer (A-CM$_2$-HEM$_2$); an apophyllite-derived 3-cyanopropyldimethylsiloxy-vinyldimethylsiloxy sheet polymer (A-CM$_2$-VM$_2$); and an apophyllite-derived 3-cyanopropyldimethylsiloxy-n-decyldimethylsiloxy sheet polymer (A-CM$_2$-DM$_2$). These polymers form gels with simple polar solvents such as acetone and therefore can be easily processed. The first two of the polymers, i.e., A-CM$_2$-HEM$_2$ and A-CM$_2$-VM$_2$, form gels with polar solvents carrying olefinic linkages, and these gels can be crosslinked into sheet composites having fully exfoliated organosilicon sheets in an organic matrix.

6 Claims, No Drawings

SHEET AND TUBE SILOXANE POLYMERS CONTAINING MULTIPLE PENDENT GROUPS

FIELD OF THE INVENTION

This invention is directed to polymers derived from naturally occurring sheet silicates, synthetic sheet silicates, naturally occurring tube silicates, and synthetic tube silicates, which contain more than one type of pendent group.

BACKGROUND OF THE INVENTION

While U.S. Pat. No. 5,605,982 (Feb. 25, 1997) describes a process for making organopolysiloxane sheet or tube polymers by contacting a sheet or tube silicate with an alkenyl group containing chlorosilane to form an alkenylsiloxy polymer, it does not teach the simultaneous reaction of two or more halosilanes with a sheet silicate or a tube silicate, to produce sheet or tube-like organosiloxane polymers containing multiple pendent groups as is described herein. The advantage of multiple pendent groups on such sheet and tube siloxane polymers is that they allow good control and manipulation of the polarity of the resulting polymers.

BRIEF SUMMARY OF THE INVENTION

This invention relates to a method of making an organopolysiloxane sheet or tube polymer having at least two different pendent organosilyl groups by contacting a sheet or tube silicate simultaneously with two or more different organohalosilanes, in the presence of a polar solvent or in the presence of a mixture of a polar solvent and a non-polar solvent, and heating the resulting mixture of the sheet or tube silicate, the organohalosilanes, and the solvent, until an organopolysiloxane sheet or tube polymer having at least two different pendent organosilyl groups is formed.

The invention further relates to (i) the organopolysiloxane sheet or tube polymer prepared according to the above method; (ii) a gel prepared by mixing the organopolysiloxane sheet or tube polymer with a polar solvent, and allowing the mixture to stand at room temperature; and (iii) a crosslinked composite prepared by mixing the organopolysiloxane sheet or tube polymer with a polar solvent having an unsaturated linkage, in the presence of a suitable catalyst.

These and other features and objects of the invention will become apparent from a consideration of the detailed description.

DETAILED DESCRIPTION OF THE INVENTION

The present invention relates to the synthesis, characterization, and the utilization of sheet siloxane polymers containing more than one type of pendent group. The present invention is also directed to the synthesis and utilization of tube siloxane polymers containing multiple pendent groups. The polymers are derived from naturally occurring or synthetic sheet silicates and can be derived from naturally occurring or synthetic tube silicates.

A typical synthesis involves the simultaneous reaction of two or more monohalosilanes (i.e., $R_3SiX$) with a sheet silicate or a tube silicate to produce a sheet or tube-like organosiloxane polymer that contains multiple pendent groups.

Preferably, the halosilanes are monochlorosilanes represented by the formula $R^1R^2R^3SiCl$ where $R^1$, $R^2$, and $R^3$ represent an alkyl group containing 1–30 carbon atoms, another non-reactive group, or a reactive group.

It is also possible to use dichlorosilanes $R^1R^2SiCl_2$, trichlorosilanes $R^1SiCl_3$, or mixtures of dichlorosilanes and trichlorosilanes with the monochlorosilane concurrently, or mixtures of dichlorosilanes and trichlorosilanes in the reaction with the sheet silicate or the tube silicate, to produce the distinctively structured siloxanes with multiple pendent groups.

Most preferably, at least one of the $R^1$, $R^2$, or $R^3$ groups in the monochlorosilane, the dichlorosilane, and the trichlorosilane, should be a group containing an unsaturated group. Some examples of representative chlorosilanes that may be employed according to this invention are vinyldimethylchlorosilane $H_2C=CH(CH_3)_2SiCl$, vinylmethyldichlorosilane $H_2C=CH(CH_3)SiCl_2$, vinylethyldichlorosilane $H_2C=CH(CH_3CH_2)SiCl_2$, vinyloctyldichlorosilane $H_2C=CH[CH_3(CH_2)_6CH_2]SiCl_2$, vinyltrichlorosilane $H_2C=CHSiCl_3$, allyldimethylchlorosilane $H_2C=CHCH_2(CH_3)_2SiCl$, allyl(chloromethyl)dichlorosilane $H_2C=CHCH_2(ClCH_2)SiCl_2$, allyl(chloropropyl)dichlorosilane $H_2C=CHCH_2(ClCH_2CH_2CH_2)SiCl_2$, allyldichlorosilane $H_2C=CHCH_2(H)SiCl_2$, allylmethyldichlorosilane $H_2C=CHCH_2(CH_3)SiCl_2$, allylhexyldichlorosilane $H_2C=CHCH_2[CH_3CH_2CH_2CH_2CH_2CH_2]SiCl_2$, allyltrichlorosilane $H_2C=CHCH_2SiCl_3$, 5-hexenyldimethylchlorosilane $H_2C=CH(CH_2)_4(CH_3)_2SiCl$, 5-hexenyltrichlorosilane $H_2C=CH(CH_2)_4SiCl_3$, 7-octenyldimethylchlorosilane $H_2C=CH(CH_2)_6(CH_3)_2SiCl$, 7-octenyltrichlorosilane $H_2C=CH(CH_2)_6SiCl_3$, 3-cyanopropyldimethylchlorosilane $N\equiv CCH_2CH_2CH_2(CH_3)_2SiCl$, 3-cyanopropyldiisopropylchlorosilane $N\equiv CCH_2CH_2CH_2[CH(CH_3)_2]_2SiCl$, 2-cyanoethylmethyldichlorosilane $N\equiv CCH_2CH_2(CH_3)SiCl_2$, 3-cyanopropylmethyldichlorosilane $N\equiv CCH_2CH_2CH_2(CH_3)SiCl_2$, 2-cyanoethyltrichlorosilane $N\equiv CCH_2CH_2SiCl_3$, 3-cyanopropyltrichlorosilane $N\equiv CCH_2CH_2CH_2SiCl_3$, n-decyldimethylchlorosilane $CH_3(CH_2)_9(CH_3)_2SiCl$, n-decylmethyldichlorosilane $CH_3(CH_2)_9(CH_3)SiCl_2$, and n-decyltrichlorosilane $CH_3(CH_2)_9SiCl_3$.

One sheet silicate most preferred to be used herein is the mineral apophyllite $KCa_4Si_8O_{20}(OH,F)\cdot 8H_2O$, while the most preferred tube silicate is a synthetic silicate $K_2CuSi_4O_{10}$. Other natural and synthetic layered and tube silicates can also be used, such as magadiite $Na_2Si_{14}O_{29}\cdot 7H_2O$; kenyaite $Na_2Si_{22}O_{45}\cdot 9H_2O$; silinaite $NaLiSi_2O_5\cdot 2H_2O$; or chrysotile $Mg_3(OH)_4Si_2O_5$.

The sheet silicate apophyllite $KCa_4Si_8O_{20}(OH,F)\cdot 8H_2O$ and other such silicates are commercially available, and may be purchased from supply houses such as Ward's Natural Science Establishment, Rochester, N.Y., and Gelest, Tullytown, Pa.

Methods of preparing tube silicates such as $K_2CuSi_4O_{10}$ are described in various publications including U.S. Pat. No. 4,942,026 (Jul. 17, 1990); U.S. Pat. No. 5,605,982 (Feb. 25, 1997); U.S. Pat. No. 5,627,241 (May 6, 1997); *Polymer Preprints* (American Chemical Society, Division of Polymer Chemistry) Volume 32(3), Pages 508–509, (1991); and *Colloids and Surfaces*, Volume 63, Pages 139–149, (1992).

For the sake of simplicity, the following abbreviations have been used herein:

A-$CM_2$-$HEM_2$ for an apophyllite-derived 3-cyanopropyldimethylsiloxy-5-hexenyldimethylsiloxy sheet polymer of the formula $[(NCC_3H_6)(CH_3)_2SiO)_x((CH_2=CHC_4H_8)(CH_3)_2SiO)_y(HO)_{1-x-y}SiO_{1.5}]_n$;

A-CM$_2$-VM$_2$ for an apophyllite-derived 3-cyanopropyldimethylsiloxy-vinyldimethylsiloxy sheet polymer of the formula [((NCC$_3$H$_6$)(CH$_3$)$_2$SiO)$_x$((CH$_2$=CH)(CH$_3$)$_2$SiO)$_y$(HO)$_{1-x-y}$SiO$_{1.5}$]$_n$; and A-CM$_2$-DM$_2$ for an apophyllite-derived 3-cyanopropyldimethylsiloxy-n-decyldimethylsiloxy sheet polymer of the formula [((NCC$_3$H$_6$)(CH$_3$)$_2$SiO)$_x$((n-C$_{10}$H$_{21}$)(CH$_3$)$_2$SiO)$_y$(HO)$_{1-x-y}$SiO$_{1.5}$]$_n$.

In these formulas, the value of "x" and "y" is determinable by solid state nuclear magnetic resonance (NMR) experiments, and typically, a value for x+y has been found to be equal to or less than about 0.60. A value for "n", however, is indeterminable.

Also, as used herein, the term "exfoliated" is intended to mean a complete separation or disassociation of individual layers, such that individual layers separate from one another, as well as lose their ordered arrangement.

For example, one such sheet organosiloxane polymer was derived from the reaction of the layered silicate apophyllite with a mixture of 3-cyanopropyldimethylchlorosilane and 5-hexenyldimethylchlorosilane, i.e., A-CM$_2$-HEM$_2$. Another apophyllite-derived polymer was produced from the reaction of apophyllite with a mixture of 3-cyanopropyldimethylchlorosilane and vinyldimethylchlorosilane, i.e., A-CM$_2$-VM$_2$. These sheet polymers can be characterized by an interlayer spacing that is dependent upon the characteristics of the particular chlorosilanes and sheet silicate which are employed. Thus, it was found that the polymer A-CM$_2$-HEM$_2$ had an interlayer spacing d(I/I$_0$)=19.8 Å, and that the polymer A-CM$_2$-VM$_2$ had an interlayer spacing d(I/I$_0$)=17.4 Å.

The reaction is carried out in the presence of a solvent. Some examples of representative polar solvents that are useful herein include N,N-dimethylformamide (DMF), dimethylacetamide, dimethyl sulfoxide (DMSO), N-methylpyrrolidinone, and 1,3-dimethyl-3,4,5,6-tetrahydro-2(1H)-pyrimidinone (DMPU). The reaction can also be carried out in the presence of a mixture of a polar solvent and a non-polar solvent, such as a mixture of N,N-dimethylformamide and toluene, for example.

The sheet and tube siloxanes according to this invention have utility, for example, as a discontinuous phase in various composite applications. Their polarity can be tuned by choosing an appropriate mixture of chlorosilanes, and the appropriately tuned polymers can then be used to form gels with fluid matrices, strong elastomers with high molecular weight polymer matrices, and rigid composites with resin matrices.

In addition, the polymers A-CM$_2$-VM$_2$ and A-CM$_2$-HEM$_2$ were found to form stiff gels with several polar solvents such as acetone, methyl ethyl ketone, N,N-dimethylformamide, and dimethylsulfoxide. Such gels can be processed to form films with their sheets oriented approximately parallel to the substrate surface via spreading and solvent evaporation, fibers via extrusion through an orifice, or monoliths via compression molding.

EXAMPLES

The following examples are set forth in order to illustrate the invention in more detail.

Example 1

Preparation of (A-CM$_2$-HEM$_2$)—Apophyllite-Derived 3-Cyanopropyldimethylsiloxy-5-hexenyldimethylsiloxy Sheet Polymer [((NCC$_3$H$_6$)(CH$_3$)$_2$SiO)$_x$((CH$_2$=CHC$_4$H$_8$)(CH$_3$)$_2$SiO)$_y$(HO)$_{1-x-y}$ SiO$_{1.5}$]$_n$ A suspension of apophyllite (120 mesh, 1.2 g, 1.3 mmol), 3-cyanopropyldimethylchlorosilane (5.2 mL, 33 mmol), 5-hexenyldimethylchlorosilane (5.9 mL, 28 mmol), and dimethylformamide (60 mL) was refluxed for 3.25 h and filtered. The solid was washed with hexane (20 mL), acetone (20 mL), a solution of water and acetone (1:1, 100 mL), and acetone (20 mL), air dried, and weighed (1.0 g). The following is the product infrared spectrum (IR) using an evaporated acetone-gel film, cm$^{-1}$): 3418 (m br, H-bonded OH stretch), 3076 (w, C=CH stretch), 2958 (m, CH stretch), 2928 (s, CH stretch), 2246 (m, CN stretch), 1640 (m, C=C stretch), 1426 (m, CH deformation), 1346 (w, CH deformation), 1256 (s, SiCH$_3$ deformation), 1066 (vs br, SiOSi stretch), 914 (w), 842 (s, SiC), 738 (w), 668 (w, CH bend), 580 (w), 438 (s). The product had the following powder X-ray diffractometry (XRD) data, (d(Å) (I/I$_0$)): 19.8 (100). The polymer product was a white solid. It did not dissolve in hexane, toluene or water.

In Example 1, the treatment of apophyllite with the mixture of 3-cyanopropyldimethylchlorosilane and 5-hexenyldimethylchlorosilane in dimethylformamide provided the apophyllite-derived 3-cyanopropyldimethylsiloxy-5-hexenyldimethylsiloxy sheet polymer, A-CM$_2$-HEM$_2$. The reaction for forming this polymer is shown below. In this reaction, the chlorine combines directly or indirectly with cations (e.g., Ca$^{2+}$) of the silicate.

KCa$_4$Si$_8$O$_{20}$(F,OH).8H$_2$O+(NCC$_3$H$_6$)(CH$_3$)$_2$SiCl+
(CH$_2$=CHC$_4$H$_8$)(CH$_3$)$_2$SiCl→
[((NCC$_3$H$_6$)(CH$_3$)$_2$SiO)$_x$((CH$_2$=CHC$_4$H$_8$)
(CH$_3$)$_2$SiO)$_y$(HO)$_{1-x-y}$SiO$_{1.5}$]$_n$ 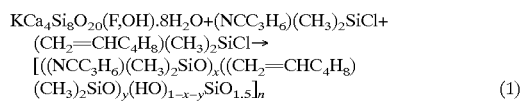 (1)

Support for the formulation of this polymer was provided by the presence of C=CH, CH, CN, C=C and SiO bands in its infrared spectrum. The substantial strength of the CN and C=C bands showed that the level of substitution of both the (NCC$_3$H$_6$)(CH$_3$)$_2$SiO— and (CH$_2$=CHC$_4$H$_8$)(CH$_3$)$_2$SiO— groups was appreciable. Further support for the formulation of the polymer was provided by the line at 19.8 Å in its X-ray powder pattern. The intensity and narrowness of the line demonstrated that the polymer has an ordered structure.

The polymer formed stiff gels with acetone, methyl ethyl ketone, dimethylformamide, dimethylacetamide, dimethyl sulfoxide, and a solution of dimethylformamide and pyridine (v/v 1:1.6). It also formed stiff gels with acrylonitrile, allyl cyanide, crotonitrile, vinyl ethyl ketone, trans-3-pentenenitrile, vinylformamide, 2-vinylpyrrolidinone, and 2-vinylpyridine.

Example 2

Preparation of Gels

The solvent was added to the A-CM$_2$-HEM$_2$ polymer, typically in a weight ratio of about 1:7 to 1:10 polymer to solvent, and the mixture was allowed to stand at room temperature (20–25° C.) for a period of time, typically about 12 h. The presence of cyanopropyl groups in the polymer enabled it to form gels with polar solvents, as can be seen in Table I. The clarity of the gels was dependent on the index of refraction of the solvent. It was concluded that the index of refraction of the polymer was about 1.48.

The presence of hexenyl groups in the A-CM$_2$-HEM$_2$ polymer enables it to crosslink with gelling solvents having an olefinic linkage such as vinylformamide. This crosslinking reaction can be initiated using a peroxide catalyst, according to the mechanism shown below.

The following types of peroxides can be used as a catalyst in the above reaction: diaroyl peroxides such as dibenzoyl peroxide; bis-p-chlorobenzoyl peroxide and bis-2,4-dichlorobenzoyl peroxide; dialkyl peroxides such as di-t-butyl peroxide; diaralkyl peroxides such as dicumyl peroxide; alkylaryl peroxides; alkyl aroyl and alkyl acyl peroxides such as t-butyl perbenzoate or t-butyl peracetate; and mixtures of different types of peroxides such as dibenzoyl peroxide and t-butyl perbenzoate. Peroxysiloxanes and zinc peroxide are other examples of suitable catalysts.

The product of this crosslinking reaction was a dense composite with fully exfoliated sheets, and not a xerogel. The considerable variety of polar olefinic solvents available that are capable of forming gels with A-CM$_2$-HEM$_2$ indicated that a number of such composites can be manufactured.

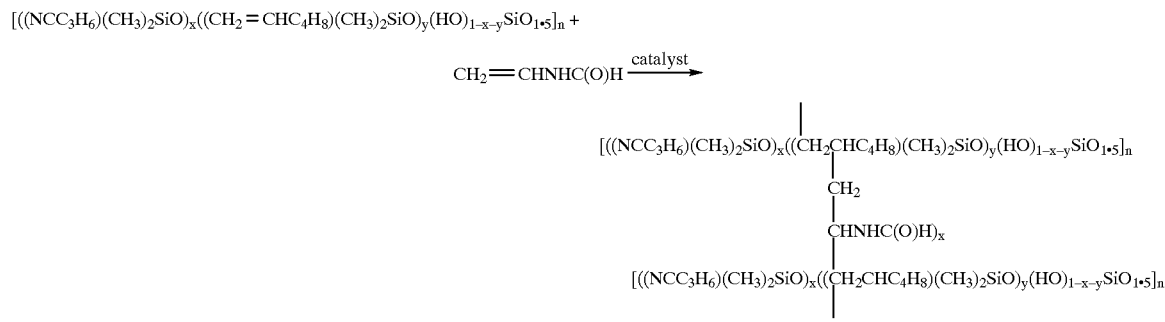

(2)

The above composite (2) contained organosilicon sheets in an organic matrix.

TABLE I

| | Gels of A-CM$_2$-HEM$_2$ | | | | |
|---|---|---|---|---|---|
| | solvent | | | gel | |
| formula | name | n$_D$ | formation | opacity | viscosity |
| O‖CH$_3$CCH$_3$ | acetone | 1.3587 | good | opaque | high |
| CH$_2$=CHCN | acrylonitrile | 1.3888 | good | opaque | high |
| O‖CH$_3$CC$_2$H$_5$ | methyl ethyl ketone | 1.3908 | good | opaque | high |
| CH$_2$=CHCH$_2$CN | allyl cyanide | 1.4050 | good | cloudy | high |
| CH$_3$CH=CHCN | crotonitrile | 1.4190 | good | cloudy | high |
| O‖CH$_2$=CHCC$_2$H$_5$ | vinyl ethyl ketone | 1.4200 | good | cloudy | high |
| CH$_3$\C=C/H / \H CH$_2$CN | trans-3-pentenenitrile | 1.4220 | good | cloudy | high |

TABLE I-continued

Gels of A-CM$_2$-HEM$_2$

| formula | solvent name | $n_D$ | gel formation | opacity | viscosity |
|---|---|---|---|---|---|
| HCN(CH$_3$)$_2$ (O double bond) | dimethylformamide | 1.4300 | good | cloudy | high |
| CH$_3$CN(CH$_3$)$_2$ (O double bond) | dimethylacetamide | 1.4384 | good | cloudy | high |
| CH$_3$SCH$_3$ (O double bond) | dimethyl sulfoxide | 1.4790 | good | clear | high |
| pyridine & HCN(CH$_3$)$_2$ (O double bond) | pyridine and dimethylformamide | 1.480 | good | clear | high |
| HCNH(CH=CH$_2$) (O double bond) | vinylformamide | 1.4940 | good | cloudy | high, |
| N-vinylpyrrolidinone structure | 2-vinylpyrrolidinone | 1.5120 | good | cloudy | high |
| 2-vinylpyridine structure | 2-vinylpyridine | 1.5490 | good | cloudy | high |

Example 3

Preparation of an A-CM$_2$-HEM$_2$ Coating

A thin layer of an A-CM$_2$-HEM$_2$ acetone gel was spread on a microscope slide, and the layer was exposed to air at room temperature for 2 days. The coating had the following powder X-ray diffractometry (XRD) data (d(Å) (I/I$_0$)): 19.4 (100). The formation of a coating of the polymer on a glass slide showed that the polymer can be processed by gel-spreading techniques. While the position of the reflection in the X-ray powder pattern of the coating was similar to that of the bulk polymer in Example 1, i.e., 19.4 vs 19.8 Å, its intensity was considerably greater, i.e., 5877 vs 3271 cps. This showed that the sheets were more highly oriented in the coating.

Example 4

Preparation of (A-CM$_2$-VM$_2$)—Apophyllite-Derived 3-Cyanopropyldimethylsiloxy-vinyldimethylsiloxy Sheet Polymer [((NCC$_3$H$_6$)(CH$_3$)$_2$SiO)$_x$((CH$_2$=CH)(CH$_3$)$_2$SiO)$_y$(HO)$_{1-x-y}$SiO$_{1.5}$]$_n$ A suspension of apophyllite (120 mesh, 1.0 g, 1.1 mmol), 3-cyanopropyldimethylchlorosilane (4.0 mL, 24 mmol), vinyldimethylchlorosilane (3.5 mL, 25 mmol), and dimethylformamide (50 mL) was refluxed for 3 h and filtered. The solid was washed with hexane (20 mL), acetone (20 mL), a solution of water and acetone (1:1, 80 mL), and acetone (20 mL), air dried, and weighed (0.79 g). IR (evaporated acetone-gel film, cm$^{-1}$): 3450 (w br, H-bonded OH stretch), 3050 (w, C=CH stretch), 2960 (m, CH stretch), 2246 (m, CN stretch), 1596 (w, C=C stretch), 1408 (w, CH deformation), 1256 (s, SiCH$_3$ deformation), 1060 (vs br, SiOSi stretch), 840 (s, SiC), 790 (s), 714 (w), 576 (w), 434 (s). XRD (d(Å) (I/I$_0$)): 17.4 (100). The polymer was a white solid. It did not dissolve in hexane, toluene, or water.

In Example 4, the treatment of apophyllite with a mixture of 3-cyanopropyldimethylchlorosilane and vinyldimethylchlorosilane in dimethylformamide provided apophyllite-derived 3-cyanopropyldimethylsiloxy-vinyldimethylsiloxy sheet polymer (A-CM$_2$-VM$_2$). The reaction for forming this polymer is shown below.

$$KCa_4Si_8O_{20}(F,OH)\cdot 8H_2O + (NCC_3H_6)(CH_3)_2SiCl + (CH_2=CH)(CH_3)_2SiCl \rightarrow$$
$$[((NCC_3H_6)(CH_3)_2SiO)_x((CH_2=CH)(CH_3)_2SiO)_y(HO)_{1-x-y}SiO_{1.5}]_n \quad (3)$$

Evidence for the formulation of the polymer was provided by the presence of C=CH, CH, CN, C=C, and SiO bands in its infrared spectrum. The strength of the CN and C=C bands indicated that the level of substitution of the (NCC$_3$H$_6$)(CH$_3$)$_2$SiO— group and the (CH$_2$=CH)(CH$_3$)$_2$SiO— group was relatively high. Further support for the structure shown above was provided by the line at 17.4 Å in its X-ray powder pattern. The intensity and narrowness of the line indicated that the polymer had a well-ordered sheet structure.

ethyl ketone, trans-3-pentenenitrile, vinylformamide, 2-vinylpyrrolidinone, and 2-vinylpyridine. As was the case with the 3-cyanopropyldimethylsiloxy-5-hexenyldimethylsiloxy sheet polymer Example 1, the existence of cyanopropyl groups in the polymer Example 4 enables it to form gels as can be seen in Table II.

TABLE II

Gels of A-CM$_2$-VM$_2$

| formula | solvent name | $n_D$ | gel formation | opacity | viscosity |
|---|---|---|---|---|---|
| CH$_3$CCH$_3$ (O) | acetone | 1.3587 | good | opaque | high |
| CH$_2$=CHCN | acrylonitrile | 1.3888 | good | opaque | high |
| CH$_3$CC$_2$H$_5$ (O) | methyl ethyl ketone | 1.3908 | good | opaque | high |
| CH$_2$=CHCH$_2$CN | allyl cyanide | 1.4050 | good | cloudy | high |
| CH$_3$CH=CHCN | crotonitrile | 1.4190 | good | cloudy | high |
| CH$_2$=CHCC$_2$H$_5$ (O) | vinyl ethyl ketone | 1.4200 | good | cloudy | high |
| CH$_3$\C=C/H, H/ \CH$_2$CN | trans-3-pentenenitrile | 1.4220 | good | cloudy | high |
| HCN(CH$_3$)$_2$ (O) | dimethylformamide | 1.4300 | good | cloudy | high |
| CH$_3$SCH$_3$ (O) | dimethyl sulfoxide | 1.4790 | good | clear | high |
| HCNH(CH=CH$_2$) (O) | vinylformamide | 1.4940 | good | cloudy | high |
| N—CH=CH$_2$ (pyrrolidinone ring) | 2-vinylpyrrolidinone | 1.5120 | good | cloudy | high |
| pyridine-CH=CH$_2$ | 2-vinylpyridine | 1.5490 | good | cloudy | high |

The polymer formed stiff gels using the procedure of Example 2 with acetone, methyl ethyl ketone, dimethylformamide, and dimethyl sulfoxide. It also formed stiff gels with acrylonitrile, allyl cyanide, crotonitrile, vinyl The existence of vinyl groups in the polyer prepared in Example 4 enables it to form crosslinked, fully exfoliated, composites with gelling solvents carrying an olefinic linkage such as 2-vinylpyridine. This crosslinking reaction can also be initiated as noted above, by using a peroxide catalyst according to the mechanism shown below.

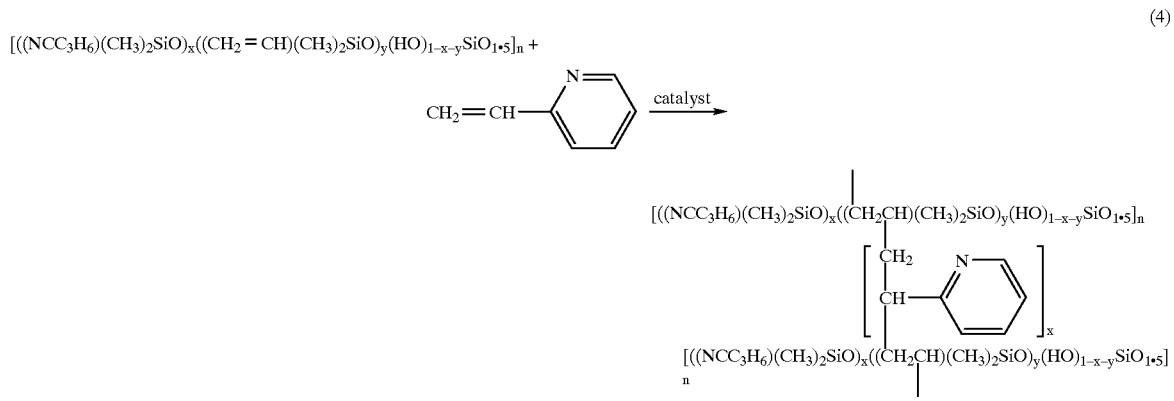

(4)

The above composite (4) contained organsilicon sheets in an organic matrix.

Example 5

Preparation of (A-CM$_2$-DM$_2$)—Apophyllite-Derived 3-Cyanopropyldimethylsiloxy-n-decyldimethylsiloxy Sheet Polymer [((NCC$_3$H$_6$)(CH$_3$)$_2$SiO)$_x$((n-C$_{10}$H$_{21}$)(CH$_3$)$_2$SiO)$_y$(HO)$_{1-x-y}$SiO$_{1.5}$]$_n$ A suspension of apophyllite (120 mesh, 1.0 g, 1.1 mmol), 3-cyanopropyldimethylchlorosilane (4.0 mL, 24 mmol), n-decyldimethylchlorosilane (5.5 mL, 22 mmol), and dimethylformamide (40 mL), was refluxed for 3.5 h and filtered. The solid was washed with hexane (20 mL), acetone (20 mL), a solution of water and acetone (1:1, 80 mL), and acetone (20 mL), air dried, and weighed (1.0 g). IR (evaporated acetone-gel film, cm$^{-1}$): 3404 (m br, H-bonded OH stretch), 2958 (m, CH stretch), 2956 (s, CH stretch), 2246 (m, CN stretch), 1426 (m, CH deformation), 1346 (w, CH deformation), 1256 (s, SiCH$_3$ deformation), 1066 (vs br, SiOSi stretch), 842 (s, SiC), 584 (w), 438 (s). XRD (d(Å) (I/I$_0$)): 22.2 (100). The polymer was a white solid. It did not dissolve in hexane, toluene, or water.

In Example 5, the treatment of apophyllite with the mixture of 3-cyanopropyldimethylchlorosilane and n-decyldimethylchlorosilane in dimethylformamide provided the apophyllite-derived 3-cyanopropyldimethylsiloxy-n-decyldimethylsiloxy sheet polymer (A-CM$_2$-DM$_2$). The reaction for forming this polymer is shown below.

KCa$_4$Si$_8$O$_{20}$(F,OH).8H$_2$O+(NCC$_3$H$_6$)(CH$_3$)$_2$SiCl+(n-C$_{10}$H$_{21}$)(CH$_3$)$_2$SiCl→[((NCC$_3$H$_6$)(CH$_3$)$_2$SiO)$_x$((n-C$_{10}$H$_{21}$)(CH$_3$)$_2$SiO)$_y$(HO)$_{1-x-y}$SiO$_{1.5}$]$_n$ (5)

Support for the formulation of the polymer prepared in Example 5 was provided by the presence of CH, CN, and SiO bands in its infrared spectrum. The strength of the CN and CH bands indicated that the level of substitution of the (NCC$_3$H$_6$)(CH$_3$)$_2$Sio— group and the (n-C$_{10}$H$_{21}$)(CH$_3$)$_2$SiO— group was reasonably high. Further support for the structure of the polymer was provided by the line at 22.2 Å in its X-ray powder pattern. The intensity and narrowness of the line demonstrated that the polymer was a well-ordered sheet polymer.

Using the procedure in Example 2, the polymer in Example 5 formed stiff gels with acetone, methyl ethyl ketone, and dimethylformamide. It also formed a fluid gel with dimethyl sulfoxide. The ability of the polymer prepared in Example 5 to form gels with a number of polar solvents is shown below in Table III.

TABLE III

Gels of A-CM$_2$-DM$_2$

| solvent | | | gel | | |
|---|---|---|---|---|---|
| formula | name | $n_D$ | formation | opacity | viscosity |
| O‖CH$_3$CCH$_3$ | acetone | 1.3587 | good | opaque | high |
| O‖CH$_3$CC$_2$H$_5$ | methyl ethyl ketone | 1.3908 | good | opaque | high |
| O‖HCN(CH$_3$)$_2$ | dimethylformamide | 1.4300 | good | opaque | high |
| O‖CH$_3$SCH$_3$ | dimethyl sulfoxide | 1.4790 | marginal | clear | low |

The inability of the polymer prepared in Example 5 to form a stiff gel with dimethyl sulfoxide at a moderate loading is attributed to its decyl groups being non-polar groups which do not interact strongly with the dimethyl sulfoxide molecule. This shows that the properties of such polymers can be tailored to meet specific needs.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A composition comprising a gel prepared by mixing an organopolysiloxane sheet or tube polymer with a polar solvent, and allowing the mixture to stand at room temperature, the organopolysiloxane sheet or tube polymer having at least two different pendent organosilyl groups and being prepared by contacting a sheet or tube silicate simultaneously with two or more different organohalosilanes, in the presence of a polar solvent or in the presence of a mixture of a polar solvent and a non-polar solvent, and heating the resulting mixture of the sheet or tube silicate, the organohalosilanes, and the solvent, until an organopolysiloxane sheet or tube polymer having at least two different pendent organosilyl groups is formed.

2. A gel according to claim 1 in which the polar solvent is selected from the group consisting of acetone, acrylonitrile, methyl ethyl ketone, allyl cyanide, crotonitrile, vinyl ethyl ketone, trans-3-pentenenitrile, N,N-dimethylformamide, dimethylacetamide, dimethyl sulfoxide, pyridine and dimethylformamide, vinylformamide, 2-vinylpyrrolidinone, and 2-vinylpyridine.

3. A composition comprising a crosslinked composite obtained by mixing an organopolysiloxane sheet or tube polymer with a polar solvent having an unsaturated linkage in the presence of a peroxide catalyst, the organopolysiloxane sheet or tube polymer having at least two different pendent organosilyl groups and being prepared by contacting a sheet or tube silicate simultaneously with two or more different organohalosilanes, in the presence of a polar solvent or in the presence of a mixture of a polar solvent and a non-polar solvent, and heating the resulting mixture of the sheet or tube silicate, the organohalosilanes, and the solvent, until an organopolysiloxane sheet or tube polymer having at least two different pendent organosilyl groups is formed.

4. A crosslinked composite according to claim 3 in which the polar solvent having an unsaturated linkage is selected from the group consisting acrylonitrile, allyl cyanide, crotonitrile, vinyl ethyl ketone, trans-3-pentenenitrile, vinylformamide, 2-vinylpyrrolidinone, and 2-vinylpyridine.

5. A method of making an organopolysiloxane sheet or tube polymer having at least two different pendent organosilyl groups comprising contacting a sheet or tube silicate simultaneously with two or more different organohalosilanes, in the presence of a polar solvent or in the presence of a mixture of a polar solvent and a non-polar solvent, and heating the resulting mixture of the sheet or tube silicate, the organohalosilanes, and the solvent, until an organopolysiloxane sheet or tube polymer having at least two different pendent organosilyl groups is formed; the organohalosilanes being selected from the group consisting of (i) dichlorosilanes having the formula $R^1R^2SiCl_2$; (ii) trichlorosilanes having the formula $R^1SiCl_3$; (iii) a mixture of a monochlorosilane having the formula $R^1R^2R^3SiCl$ and a dichlorosilane or a trichlorosilane; and (iv) mixtures of the dichlorosilanes and the trichlorosilanes; where in each formula $R^1$, $R^2$, and $R^3$ represent an alkyl group containing 1–30 carbon atoms, or a reactive organic group containing an unsaturated group.

6. An organopolysiloxane sheet or tube polymer prepared according to the method defined in claim 5.

* * * * *